US012793975B2

(12) United States Patent
Kwon et al.

(10) Patent No.: US 12,793,975 B2
(45) Date of Patent: Nov. 10, 2026

(54) POSITIVE ELECTRODE SLURRY COMPOSITION, POSITIVE ELECTRODE AND LITHIUM SECONDARY BATTERY MANUFACTURED USING THE SAME

(71) Applicant: LG Energy Solution, Ltd., Seoul (KR)

(72) Inventors: O Jong Kwon, Daejeon (KR); Jung Hun Choi, Daejeon (KR); Ju Ryoun Kim, Daejeon (KR); Min Chul Jang, Daejeon (KR); Ki Woong Kim, Daejeon (KR); In Gu An, Daejeon (KR); Yong Hee Kang, Daejeon (KR); Ji Eun Kim, Daejeon (KR); Jeong Geun Jo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 772 days.

(21) Appl. No.: 18/069,602

(22) Filed: Dec. 21, 2022

(65) Prior Publication Data

US 2023/0207798 A1 Jun. 29, 2023

(30) Foreign Application Priority Data

Dec. 24, 2021 (KR) ........................ 10-2021-0187190
Dec. 19, 2022 (KR) ........................ 10-2022-0178086

(51) Int. Cl.
*H01M 4/525* (2010.01)
*H01M 4/02* (2006.01)
(Continued)

(52) U.S. Cl.
CPC ......... *H01M 4/525* (2013.01); *H01M 4/0404* (2013.01); *H01M 10/052* (2013.01); *H01M 2004/021* (2013.01); *H01M 2004/028* (2013.01)

(58) Field of Classification Search
CPC .. H01M 4/525; H01M 4/0404; H01M 10/052; H01M 2004/021; H01M 2004/028
See application file for complete search history.

(56) References Cited

U.S. PATENT DOCUMENTS

2009/0301866 A1* 12/2009 Zaghib ................ H01M 4/1391 204/290.03
2010/0028773 A1 2/2010 Hirota et al.
(Continued)

FOREIGN PATENT DOCUMENTS

CN 101436654 A 5/2009
CN 102237521 B 3/2014
(Continued)

OTHER PUBLICATIONS

Machine Translation for CN-108091847-A (Year: 2018).*
(Continued)

*Primary Examiner* — Matthew T Martin
*Assistant Examiner* — Katherine N Higgins
(74) *Attorney, Agent, or Firm* — Lerner David LLP

(57) ABSTRACT

A positive electrode slurry composition includes a positive electrode active material, a conductive material, a binder, a dispersant, and a solvent, wherein the positive electrode active material includes lithium iron phosphate, the lithium iron phosphate has an average particle diameter $D_{50}$ of 1.5 μm or more, and the dispersant is included in an amount of 0.2 parts by weight to 0.9 parts by weight with respect to 100 parts by weight of solids in the positive electrode slurry composition.

12 Claims, 6 Drawing Sheets

(51) Int. Cl.

| | |
|---|---|
| ***H01M 4/04*** | (2006.01) |
| ***H01M 10/052*** | (2010.01) |

(56) References Cited

U.S. PATENT DOCUMENTS

| | | | | |
|---|---|---|---|---|
| 2011/0223482 | A1 | 9/2011 | Fujii et al. | |
| 2015/0118559 | A1 | 4/2015 | Ito et al. | |
| 2016/0087261 | A1* | 3/2016 | Han | H01M 4/70 429/231.95 |
| 2018/0316003 | A1 | 11/2018 | Horikawa et al. | |
| 2019/0157681 | A1 | 5/2019 | Ho et al. | |
| 2020/0028174 | A1 | 1/2020 | Ahn et al. | |
| 2020/0044238 | A1* | 2/2020 | Ahn | H01M 10/0525 |
| 2020/0295347 | A1 | 9/2020 | Ahn et al. | |
| 2021/0249650 | A1* | 8/2021 | Kang | H01M 4/587 |

FOREIGN PATENT DOCUMENTS

| | | | | | |
|---|---|---|---|---|---|
| CN | 107394124 | A | | 11/2017 | |
| CN | 108091847 | A | * | 5/2018 | H01M 10/0525 |
| CN | 111342145 | A | | 6/2020 | |
| CN | 111540877 | A | * | 8/2020 | H01M 4/043 |
| JP | 2010287497 | A | | 12/2010 | |
| JP | 2014182873 | A | | 9/2014 | |
| JP | 2014194927 | A | | 10/2014 | |
| JP | 2015181089 | A | | 10/2015 | |
| JP | 2016105359 | A | | 6/2016 | |
| JP | 201791913 | A | | 5/2017 | |
| JP | 2018120820 | A | | 8/2018 | |
| JP | 2020515012 | A | | 5/2020 | |
| JP | 2020515014 | A | | 5/2020 | |
| KR | 20130066766 | A | | 6/2013 | |
| KR | 20140066414 | A | | 6/2014 | |
| KR | 20150039016 | A | | 4/2015 | |
| KR | 20180075180 | A | | 7/2018 | |
| KR | 20180107759 | A | | 10/2018 | |
| KR | 20180108463 | A | | 10/2018 | |
| KR | 20190061011 | A | | 6/2019 | |
| KR | 20200004276 | A | | 1/2020 | |
| KR | 102178878 | B1 | | 11/2020 | |
| KR | 102242254 | B1 | | 4/2021 | |
| KR | 102303569 | B1 | | 9/2021 | |
| WO | 2010053174 | A1 | | 5/2010 | |
| WO | 2020059802 | A1 | | 3/2020 | |

OTHER PUBLICATIONS

English Machine Translation for CN-108091847-A (Year: 2018).*
English Machine Translation for CN-111540877-A (Year: 2020).*
International Search Report for Application No. PCT/KR2022/020839 mailed Mar. 29, 2023, pp. 1-4. [See p. 2, categorizing the cited references].
Extended European Search Report including Written Opinion for Application No. 22911857.5 dated Jun. 16, 2025 . 10 pages.

* cited by examiner

【FIG. 1】
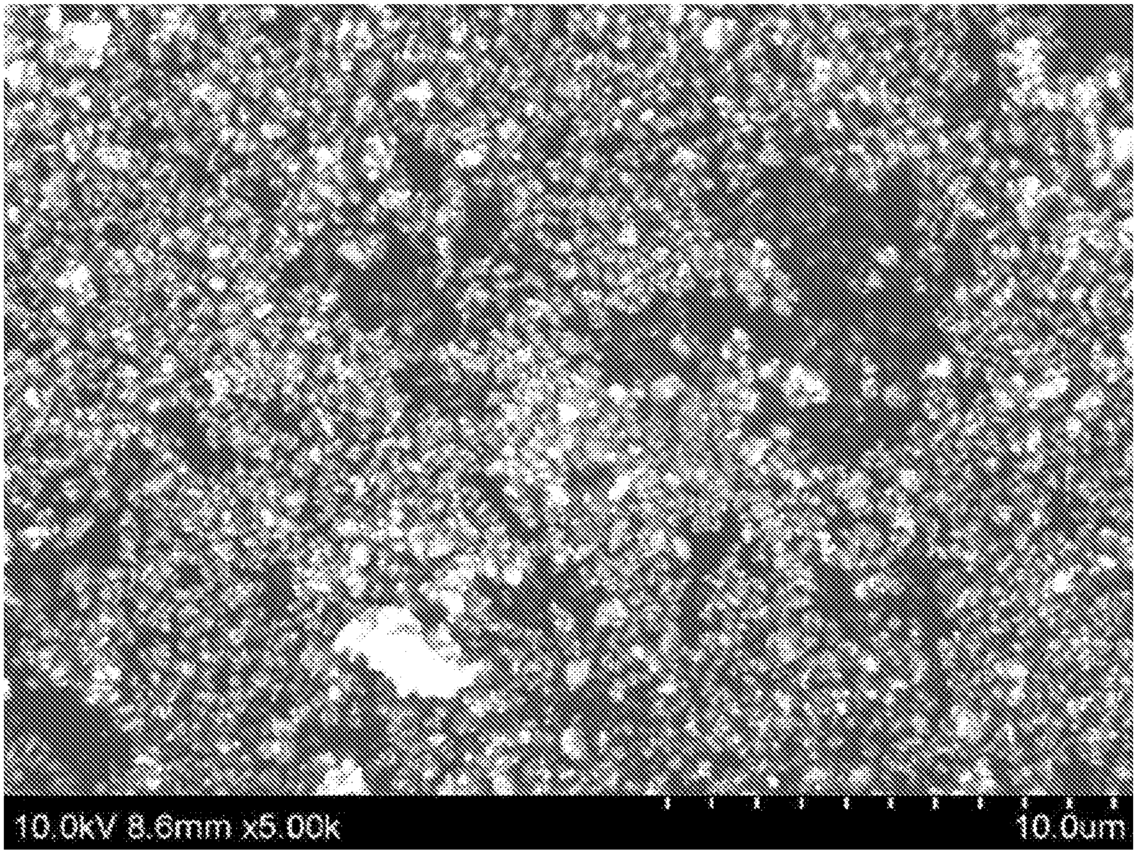

【FIG. 2】
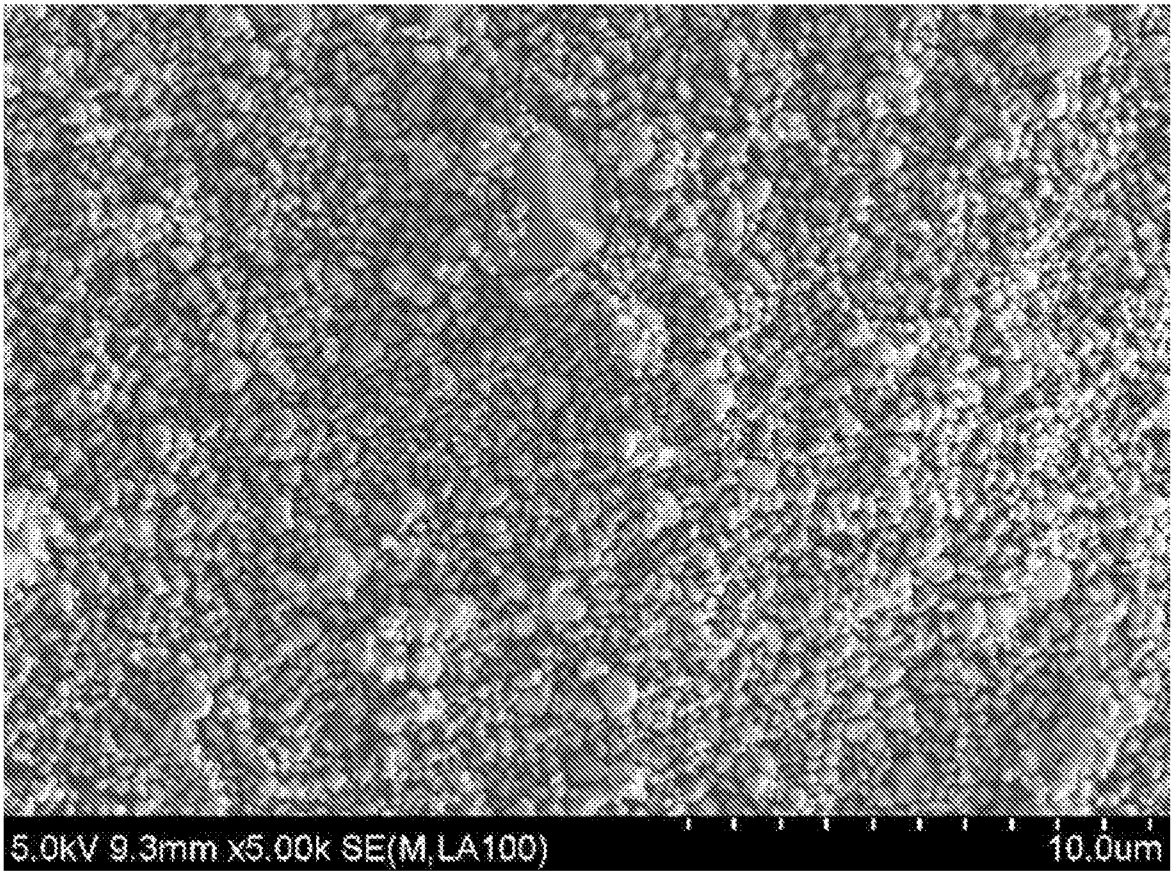

【FIG. 3】
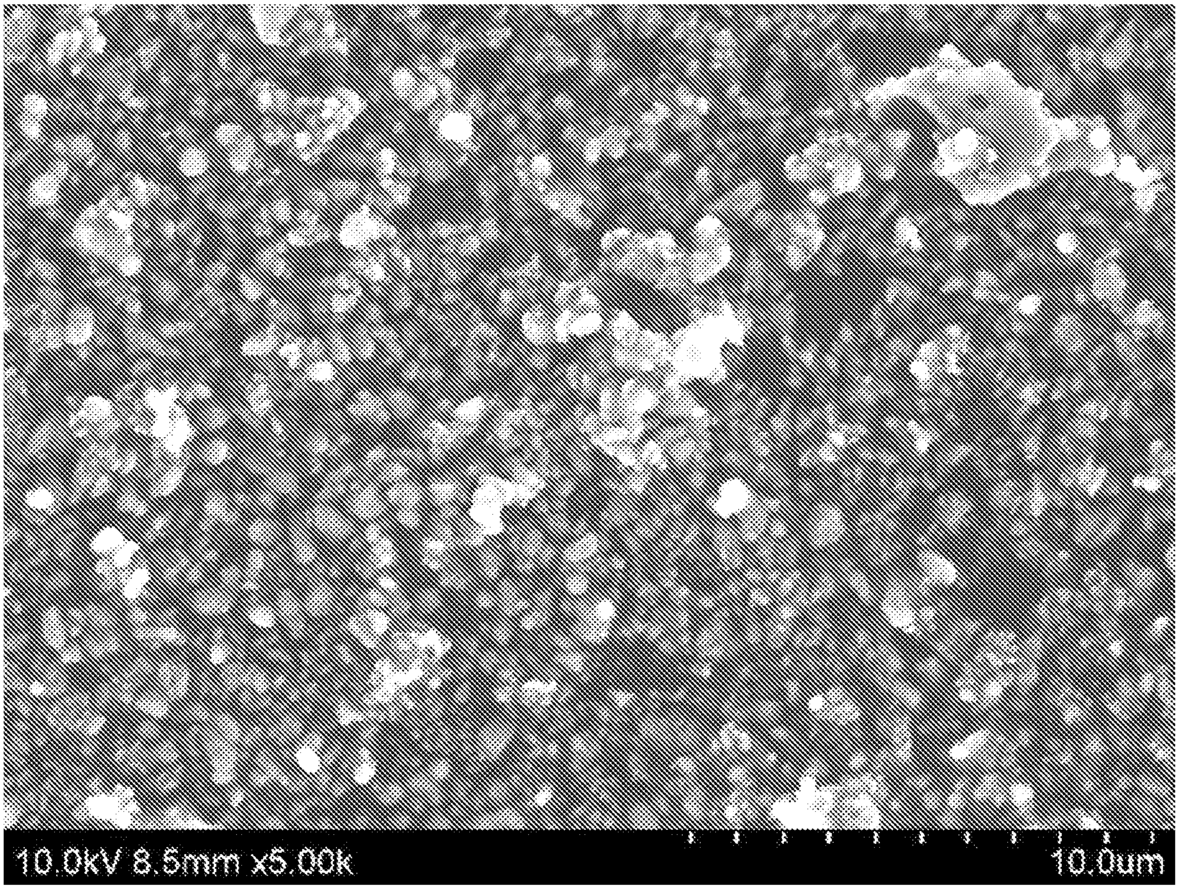

【FIG. 4】
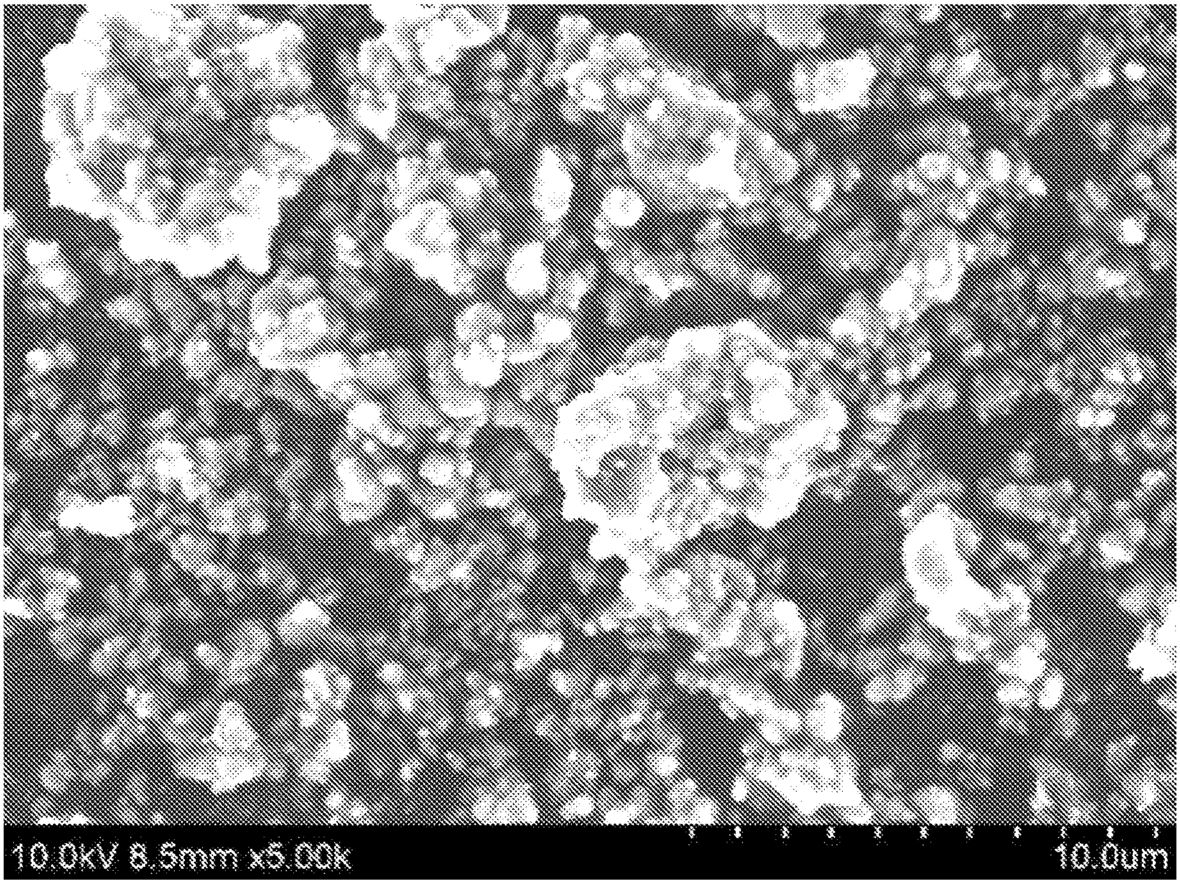

【FIG. 5】
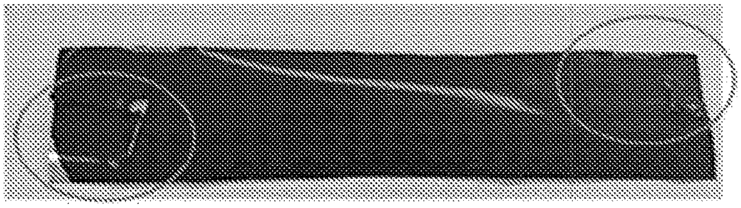
【FIG. 6】
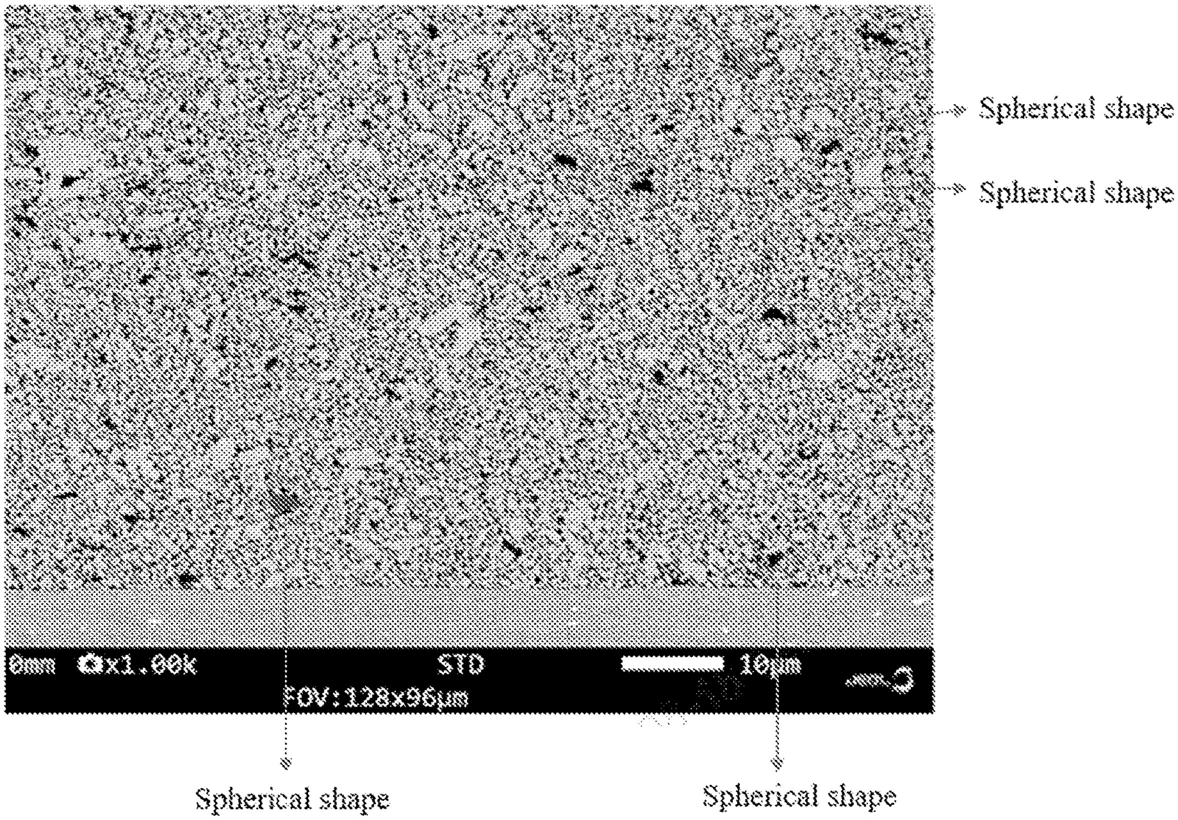

【FIG. 7】
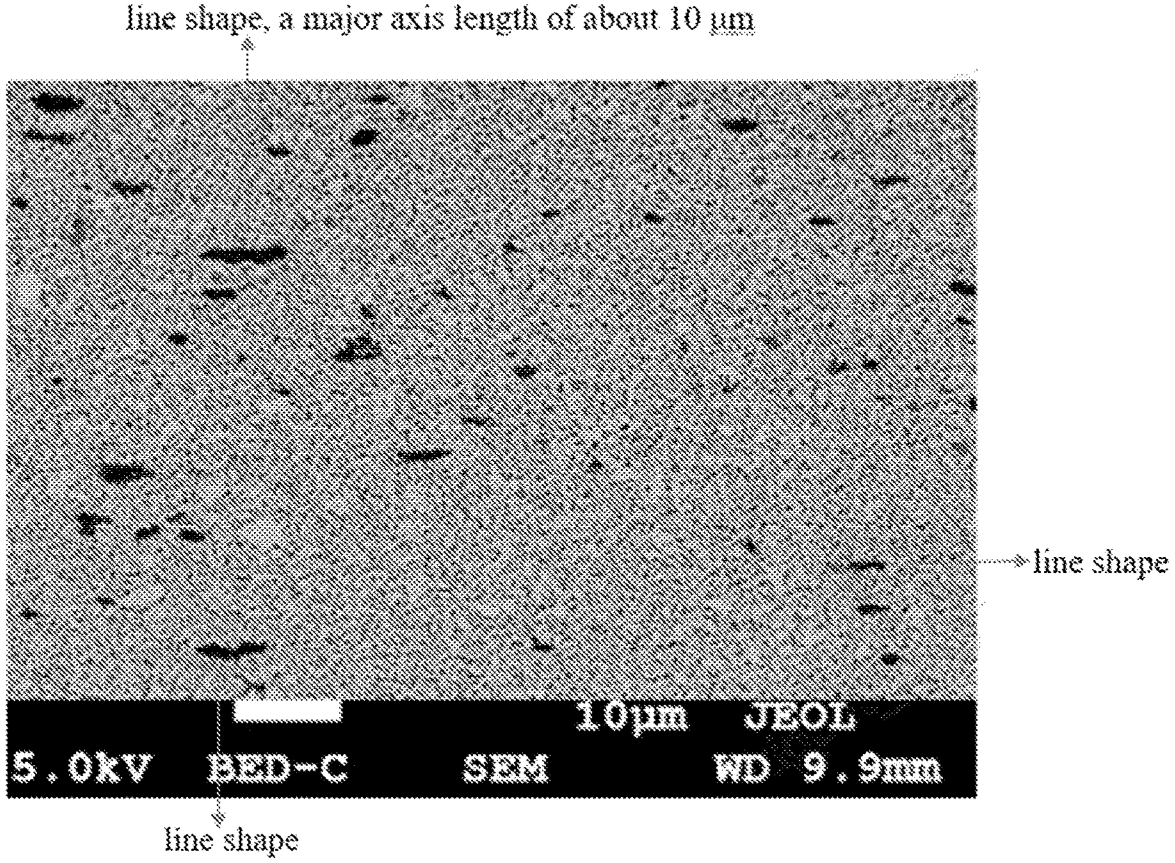

POSITIVE ELECTRODE SLURRY COMPOSITION, POSITIVE ELECTRODE AND LITHIUM SECONDARY BATTERY MANUFACTURED USING THE SAME

CROSS-REFERENCE TO PRIORITY APPLICATIONS

The present application claims priority to Korean Patent Application No. 10-2021-0187190 filed on Dec. 24, 2021, and Korean Patent Application No. 10-2022-0178086, filed on Dec. 19, 2022, the disclosures of which are incorporated herein by reference.

TECHNICAL FIELD

The present disclosure relates to a positive electrode slurry composition, and a positive electrode and lithium secondary battery manufactured using the same, and more specifically, to a positive electrode slurry composition for forming a positive electrode having excellent positive electrode adhesion, and a positive electrode and lithium secondary battery manufactured using the same.

Background Technology of the Invention

As the technology development and the demand for electric vehicles and energy storage systems (ESSs) increase, the demand for batteries as an energy source is rapidly increasing, and accordingly, various studies on batteries capable of meeting various needs have been conducted. Particularly, studies on lithium secondary batteries which exhibit excellent lifetime and cycle characteristics while having a high energy density as a power source for the device are being actively conducted.

As a positive electrode active material of the lithium secondary battery, lithium cobalt-based oxides (LCO), lithium nickel cobalt manganese-based oxides (LNCMO), lithium iron phosphate (LFP), and the like have been used.

Lithium iron phosphate is inexpensive because it is abundant in resources and contains iron, which is a low-cost material. Also, since lithium iron phosphate has low toxicity, environmental pollution can be reduced when lithium iron phosphate is used. Furthermore, since lithium iron phosphate has an olivine structure, the active material structure can be stably maintained at a high temperature as compared to lithium transition metal oxides having a layered structure. Accordingly, high-temperature stability and high-temperature lifetime characteristics can be improved.

However, lithium iron phosphate has a problem of poor lithium mobility and low electrical conductivity compared to lithium transition metal oxides such as lithium nickel cobalt manganese oxides. Accordingly, conventionally, lithium iron phosphate has been used after electrical conductivity is improved by coating the surface of lithium iron phosphate with carbon and lithium ion mobility is improved by shortening the movement route of lithium by reducing an average particle diameter of lithium iron phosphate. However, as the size of lithium iron phosphate particles is reduced, the specific surface area increases, and accordingly, particle agglomeration severely occurs. As a result, the stability of a positive electrode slurry is degraded, and coating processability is degraded. Also, when agglomeration occurs in a positive electrode slurry, lithium iron phosphate and a binder are not effectively mixed, and thus adhesion between a current collector and a positive electrode active material layer in the manufactured positive electrode (hereinafter, referred to as positive electrode adhesion) is degraded.

Although a dispersant is used to suppress slurry agglomeration, when the content of the dispersant increases, electrode resistance increases, and a region where the dispersant is distributed in an active material surface increases to reduce a contact area between the active material and a binder, and thus electrode adhesion is rather degraded.

When positive electrode adhesion is degraded, a positive electrode active material layer is separated in manufacture of an electrode or during charging and discharging, and thus battery resistance increases, and the capacity of a secondary battery decreases.

Conventionally, to solve the above problems, a technique for improving positive electrode adhesion by increasing a total binder content in a positive electrode active material layer, by interposing an adhesive layer such as a primer coating layer having a high binder content between a current collector and a positive electrode active material layer, or by increasing a binder content at an interface between a current collector and an active material layer by mitigating binder migration by increasing a drying time during electrode coating is known.

However, when a binder content in an active material layer increases, there is a disadvantage in that the resistance characteristics and energy density per volume of an electrode are degraded. Also, when a drying time increases, there is a limitation in that manufacturing costs of an electrode and a secondary battery increase.

DESCRIPTION OF THE INVENTION

Technical Problem

The present disclosure is directed to providing a positive electrode slurry composition for forming a positive electrode having excellent positive electrode adhesion.

The present disclosure is also directed to providing a positive electrode having excellent positive electrode adhesion and a lithium secondary battery whose resistance characteristics are minimally degraded by including such a positive electrode.

However, the objectives of the present disclosure are not limited to the objectives described above, and other objectives not described above will be clearly understood by those skilled in the art from the following description.

Technical Solution

According to one embodiment of the present invention, there is provided a positive electrode slurry composition which includes a positive electrode active material, a conductive material, a binder, a dispersant, and a solvent, wherein the positive electrode active material includes lithium iron phosphate, the lithium iron phosphate has an average particle diameter $D_{50}$ of 1.5 μm or more, and the dispersant is included in an amount of 0.2 parts by weight to 0.9 parts by weight with respect to 100 parts by weight of solids in the positive electrode slurry composition.

According to another embodiment of the present invention, there is provided a positive electrode which includes a current collector and a positive electrode active material layer disposed on the current collector, wherein the positive electrode active material layer includes a positive electrode active material, a conductive material, a binder, and a dispersant, the positive electrode active material includes lithium iron phosphate, the lithium iron phosphate has an average particle diameter $D_{50}$ of 1.5 μm or more, and the dispersant is included in an amount of 0.2 wt % to 0.9 wt % in the positive electrode active material layer.

According to still another embodiment of the present invention, there is provided a lithium secondary battery which includes a positive electrode, a negative electrode, a separator, and an electrolyte, wherein the positive electrode includes a positive electrode active material, a conductive material, a binder, and a dispersant in a positive electrode active material layer, the positive electrode active material includes lithium iron phosphate, the lithium iron phosphate has an average particle diameter $D_{50}$ of 1.5 μm or more, and the dispersant is included in an amount of 0.2 wt % to 0.9 wt % in the positive electrode active material layer.

Advantageous Effects

Since a positive electrode slurry composition according to the present disclosure includes lithium iron phosphate having an average particle diameter $D_{50}$ of 1.5 μm or more, particle agglomeration can be effectively prevented even with a relatively small amount of a conventional dispersant. Accordingly, the lithium iron phosphate and a binder can be present in a positive electrode active material layer while being uniformly mixed, and thus positive electrode adhesion can be improved.

In addition, since the content of a dispersant that does not contribute to positive electrode adhesion may be low, degradation of positive electrode adhesion can be minimized. Accordingly, the positive electrode active material layer is prevented from being separated, and thus an increase in battery resistance can be reduced, and the lifetime characteristics of a battery can be improved.

Additionally, when the average particle diameter of lithium iron phosphate particles satisfies the above-described range, adhesion to a current collector during rolling is improved, and thus electrode separation after rolling can be prevented.

In addition, as in the present disclosure, when lithium iron phosphate having a relatively large particle diameter is used, and the content of a dispersant is decreased, the distribution of the dispersant on the lithium iron phosphate particle surface is reduced, and thus a contact area between a binder and the lithium iron phosphate is increased. Accordingly, an improvement in positive electrode adhesion can be maximized.

Additionally, when the content of a dispersant is increased, an area in which the surface of lithium iron phosphate particles is exposed is reduced due to the dispersant, and thus electrochemical characteristics are degraded. However, in the present disclosure, since only a relatively small amount of a dispersant is included, occurrence of detrimental electrochemical characteristics, especially, battery resistance, can be suppressed.

BRIEF DESCRIPTION OF THE DRAWINGS

FIG. 1 to FIG. 4 are scanning electron microscope (SEM) images of respective lithium iron phosphates having an average particle diameter $D_{50}$ of 0.8 μm (FIG. 1), 1.0 μm (FIG. 2), 1.2 μm (FIG. 3), and 2.0 μm (FIG. 4), which are used in positive electrodes manufactured in examples and comparative examples.

FIG. 5 is an image showing that a positive electrode manufactured using a positive electrode slurry composition of Comparative Example 4 is partially separated after being rolled.

FIG. 6 is an SEM image of the cross section of a positive electrode of Example 2.

FIG. 7 is an SEM image of the cross section of a positive electrode of Comparative Example 3.

DETAILED DESCRIPTION

Advantages and features of the present disclosure and methods for achieving the same will be apparent by the exemplary embodiments described below in detail with reference to the accompanying drawings. However, the present disclosure is not limited to the exemplary embodiments described below and may be implemented in various different forms. Rather, the exemplary embodiments have been provided to make the disclosure of the present disclosure thorough and complete and to fully inform the scope of the present disclosure to those of ordinary skill in the art to which the present disclosure pertains, and the present disclosure is defined only by the scope of the claims. Throughout the specification, like reference numerals denote like elements.

All terms used herein, including technical or scientific terms, should be interpreted as having the same meaning as commonly understood by one of ordinary skill in the art to which the present disclosure pertains unless otherwise defined. Therefore, terms such as those defined in the commonly used dictionaries are not to be interpreted in an ideal or overly formal sense unless explicitly defined.

Terms used herein are for describing the exemplary embodiments and are not intended to limit the present invention. In this specification, the singular form may include the plural form unless specifically stated in the phrase. As used herein, the terms/term "comprises" and/or "comprising" do/does not preclude the presence or addition of one or more other components in addition to the stated components.

In this specification, when a component is referred to as "containing", "including", "comprising", or "having" another component, it is to be understood that the component does not exclude other components but may include other components as well, unless specifically stated otherwise.

In this specification, reference to "A and/or B" refers to A, B, or A and B.

In this specification, "%" refers to wt % unless clearly described otherwise.

In this specification, $D_{50}$ refers to a particle diameter corresponding to a cumulative volume of 50% in the particle diameter distribution curve. The $D_{50}$ may be measured, for example, by a laser diffraction method. The laser diffraction method generally enables measurement of a particle diameter ranging from submicrons to several mm and may obtain a result with high reproducibility and high resolution.

In this specification, a "specific surface area" is measured by a BET method and may be specifically calculated from the amount of nitrogen gas adsorbed at a liquid nitrogen temperature (77 K) using BELSORP-mini II commercially available from BEL Japan.

In this specification a "weight-average molecular weight (Mw)" refers to a conversion value with respect to standard polystyrene measured through gel permeation chromatography (GPC). Specifically, the weight-average molecular weight is a value obtained by converting a value measured under the following conditions using GPC, and standard polystyrene of an Agilent system is used to make a calibration curve.

<Measurement Conditions>

Analyzer: Agilent GPC (Agilent 1200 series, US)

Column: two connected PL Mixed B columns

Column temperature: 40° C.

Eluent: Tetrahydrofuran

Flow rate: 1.0 mL/min

Concentration: ~1 mg/mL (100 μL injection)

In this specification, positive electrode adhesion may be measured as follows. A positive electrode cut into pieces having a length of 150 mm and a width of 20 mm is prepared and attached in a lengthwise direction to a slide glass having a length of 75 mm and a width of 25 mm using a double-sided adhesive tape so that a positive electrode active material layer is placed to face the slide glass. That is, the slide glass is attached to an area corresponding to half of the lengthwise direction of the positive electrode. Then, rubbing is performed 10 times using a roller so that the double-sided adhesive tape is uniformly attached, thereby preparing an evaluation sample. Next, the slide glass part of the evaluation sample is fixed to the sample stage of a universal testing machine (UTM; LS5, AMETEK), and the half of the positive electrode to which the slide glass is not attached is connected to the load cell of the UTM. The load applied to the load cell is measured while moving the load cell up to 50 mm with a force at an angle of 90° and a speed of 100 mm/min. In this case, the minimum value of the load measured in the section of 20 mm to 40 mm during the driving section is obtained. This process is repeated a total of 5 times, and an average value thereof is determined as positive electrode adhesion (gf/20 mm) of each sample.

In this specification, positive electrode resistance may be measured as follows. A positive electrode including a 98 μm-thick positive electrode active material layer is cut into pieces having a size of 50 mm×50 mm to prepare a sample. The resistance per unit area (10 mm×10 mm) in the thickness direction of the positive electrode active material layer of the sample is measured using a positive electrode resistance analyzer (MP tester, HIOKI), and measurement conditions are as follows. The corresponding positive electrode is measured 3 times by the above method, and then an average value of the three measurement values when the standard deviation is within 10% is determined as positive electrode resistance.

Current: 100 μA

Speed: low

Voltage range: 0.5 V

Specific resistance of positive electrode current collector: $2.82E^{-0.6}$ Ω·cm for aluminum used above Positive Electrode Slurry Composition A positive electrode slurry composition according to an embodiment of the present invention is intended to form a positive electrode active material layer and includes a positive electrode active material, a conductive material, a binder, a dispersant, and a solvent, wherein the positive electrode active material includes lithium iron phosphate, the lithium iron phosphate has an average particle diameter $D_{50}$ of 1.5 μm or more, and the dispersant is included in an amount of 0.2 parts by weight to 0.9 parts by weight with respect to 100 parts by weight of solids in the positive electrode slurry composition.

In the case of a conventional positive electrode using lithium iron phosphate, agglomeration of the lithium iron phosphate occurs in preparation of a positive electrode slurry, and thus the coatability and electrochemical characteristics of the positive electrode slurry are degraded. Accordingly, the content of a dispersant in such a conventional positive electrode material is increased to suppress the agglomeration, but a region where the dispersant is distributed in the lithium iron phosphate surface is increased to reduce a contact area between the lithium iron phosphate and the binder, and thus electrode adhesion is rather degraded.

As a result of prolonged research to solve the above problems, the inventors of the present disclosure have found that, when lithium iron phosphate has an average particle diameter $D_{50}$ of 1.5 μm or more, and a dispersant is included in an amount of 0.2 parts by weight to 0.9 parts by weight with respect to 100 parts by weight of solids in the positive electrode slurry composition, the distribution of the dispersant on the lithium iron phosphate surface is reduced to increase a contact area, or at least a greater opportunity for contact, between the binder and the lithium iron phosphate, and accordingly, positive electrode adhesion is substantially improved. This will be described in detail below.

(1) Positive Electrode Active Material

The positive electrode active material may include lithium iron phosphate. When the positive electrode active material includes the lithium iron phosphate, the stability of a positive electrode including the positive electrode active material is substantially improved, and thus ignition of a lithium secondary battery including the positive electrode can be substantially reduced.

The lithium iron phosphate may be a compound represented by the following Chemical Formula 1.

$$Li_{1+a}Fe_{1-x}M_x(PO_{4-b})X_b \quad \text{[Chemical Formula 1]}$$

(in Chemical Formula 1, M includes any one or two or more elements selected from the group consisting of Al, Mg, Ni, Co, Mn, Ti, Ga, Cu, V, Nb, Zr, Ce, In, Zn, and Y, X includes any one or two or more elements selected from the group consisting of F, S, and N, and a, b, and x satisfy $-0.5 \le a \le 0.5$, $0 \le b \le 0.1$, and $0 \le x \le 0.5$, respectively)

For example, the lithium iron phosphate may be $LiFePO_4$.

The lithium iron phosphate may have an average particle diameter $D_{50}$ of 1.5 μm or more. When the average particle diameter of the lithium iron phosphate is less than 1.5 μm, the lithium iron phosphate is excessively agglomerated in the positive electrode slurry composition, requiring a large amount of dispersant to prevent agglomeration. Accordingly, unless a large amount of dispersant is used, the lithium iron phosphate and the binder are not effectively mixed, and thus the adhesion of a positive electrode is degraded. Also, when the content of a dispersant is increased to suppress the agglomeration, a region where the dispersant is distributed on the lithium iron phosphate surface is increased, reducing a contact area between the lithium iron phosphate and the binder, and thus positive electrode adhesion may be degraded. When positive electrode adhesion is degraded, resistance is increased in a charging/discharging process of a battery, and thus the lifetime characteristics of the battery are degraded.

When the average particle diameter $D_{50}$ of the lithium iron phosphate is 1.5 μm or more, agglomeration of the lithium iron phosphate can be suppressed even when a small amount of a dispersant is used. Also, since a region where the dispersant is distributed in the lithium iron phosphate surface is reduced to increase a contact area between the binder and the lithium iron phosphate, positive electrode adhesion can be improved. Accordingly, the separation of a positive electrode active material layer is prevented when a battery is driven, and thus an increase in battery resistance can be suppressed, and the lifetime characteristics of a battery can be improved.

Specifically, the lithium iron phosphate may have an average particle diameter $D_{50}$ of 1.5 μm to 4.5 μm, and specifically, 1.7 μm to 3.0 μm. When the average particle diameter $D_{50}$ of the lithium iron phosphate satisfies the above-described range, positive electrode adhesion is improved due to the above-described reason to prevent the separation of a positive electrode active material layer, and thus an increase in battery resistance can be suppressed. Also, an increase in battery resistance, which is caused by lithium iron phosphate having a large particle diameter, can be prevented.

The lithium iron phosphate may be in the form of a secondary particle. The form of a secondary particle refers to the form of one larger particle formed by combining a plurality of primary lithium iron phosphate particles in the form of a single particle. In this case, the combination does not simply mean agglomeration by van der Waals bonding, but may mean agglomeration by chemical bonding. When the lithium iron phosphate is in the form of a secondary particle, the above-described average particle diameter $D_{50}$ of the lithium iron phosphate corresponds to an average particle diameter $D_{50}$ of the secondary particle.

The primary lithium iron phosphate particles may have an average particle diameter $D_{50}$ of 50 nm to 400 nm, specifically 70 nm to 300 nm, and more specifically 100 nm to 200 nm. When the above-described range is satisfied, the movement route of lithium ions is shortened, and a low defect content in the crystal structure is maintained, and thus resistance performance can be increased.

The lithium iron phosphate may have a BET specific surface area of 5 $m^2/g$ to 20 $m^2/g$, specifically 7 $m^2/g$ to 18 $m^2/g$, and more specifically 9 $m^2/g$ to 16 $m^2/g$. The above-described range is a low BET specific surface area range compared to typical lithium iron phosphate. When the above-described range is satisfied, agglomeration of the lithium iron phosphate can be effectively suppressed even in a positive electrode slurry composition having a relatively small amount of a dispersant.

The lithium iron phosphate may be included in an amount of 94.8 parts by weight to 98.0 parts by weight, specifically 95.0 parts by weight to 98.0 parts by weight, and more specifically 95.1 parts by weight to 98.0 parts by weight with respect to 100 parts by weight of solids in the positive electrode slurry composition. When the content of the lithium iron phosphate satisfies the above-described range, the energy density per weight/volume of a positive electrode can be increased.

The lithium iron phosphate may further include a carbon coating layer formed on the surface of the lithium iron phosphate. The carbon coating layer may improve the electrical conductivity of the lithium iron phosphate to degrade the resistance of a positive electrode.

The carbon coating layer may be formed using at least one raw material selected from the group consisting of glucose, sucrose, lactose, starch, an oligosaccharide, a polyoligosaccharide, fructose, cellulose, a furfuryl alcohol polymer, a block copolymer of ethylene and ethylene oxide, a vinyl-based resin, a cellulose-based resin, a phenolic resin, a pitch-based resin, and a tar-based resin. Specifically, the carbon coating layer may be formed by disposing the raw materials on the surface of the lithium iron phosphate and firing the same.

(2) Dispersant

The dispersant suppresses the lithium iron phosphate from being excessively agglomerated in the positive electrode slurry composition and allows the lithium iron phosphate to be effectively dispersed in the prepared positive electrode active material layer.

The dispersant may include a hydrogenated nitrile-based copolymer. Specifically, the dispersant may be a hydrogenated nitrile-based copolymer.

Specifically, the hydrogenated nitrile-based copolymer may be a copolymer including a structural unit derived from an α,β-unsaturated nitrile and a structural unit derived from a hydrogenated conjugated diene or a copolymer including a structural unit derived from an α,β-unsaturated nitrile, a structural unit derived from a conjugated diene, and a structural unit derived from a hydrogenated conjugated diene. As the α,β-unsaturated nitrile monomer, for example, acrylonitrile, methacrylonitrile, and the like may be used, which may be used alone or in combination of two or more thereof. As the conjugated diene-based monomer, for example, a C4 to C6 conjugated diene-based monomer such as 1,3-butadiene, isoprene, 2,3-methyl butadiene, and the like may be used, which may be used alone or in combination of two or more thereof.

More specifically, the hydrogenated nitrile-based copolymer may be a hydrogenated nitrile butadiene rubber (H-NBR).

The hydrogenated nitrile butadiene rubber may have a weight-average molecular weight of 10,000 to 400,000, specifically 20,000 to 350,000, and more specifically 30,000 to 260,000. Since the above-described average particle diameter of the lithium iron phosphate is larger than the average particle diameter of conventionally used lithium iron phosphate, it is preferable that the weight-average molecular weight of the hydrogenated nitrile butadiene rubber satisfies the above-described range in view of agglomeration prevention and effective dispersion of the lithium iron phosphate.

The dispersant may be included in an amount of 0.2 parts by weight to 0.9 parts by weight, specifically 0.2 parts by weight to 0.7 parts by weight, and more specifically 0.2 parts by weight to 0.5 parts by weight with respect to 100 parts by weight of solids in the positive electrode slurry composition. Since the average particle diameter $D_{50}$ of the lithium iron phosphate is 1.5 μm or more, even when the dispersant is included in a slightly low amount as described above, agglomeration of the lithium iron phosphate can be effectively suppressed. Also, since the dispersant accounts for a small amount in the positive electrode active material layer, a contact area between the lithium iron phosphate and the binder can be increased, and thus positive electrode adhesion can be improved. Accordingly, the resistance of a positive electrode and the lifetime characteristics of a battery can be improved.

Particularly, when the dispersant is included in an amount of 0.2 parts by weight to 0.7 parts by weight with respect to 100 parts by weight of solids in the positive electrode slurry composition, the content of the dispersant that does not contribute to adhesion relative to the content of the binder that directly affects adhesion is decreased, and thus positive electrode adhesion can be substantially improved.

When the content of the dispersant exceeds 0.9 parts by weight with respect to 100 parts by weight of solids in the positive electrode slurry composition, a contact area between the lithium iron phosphate and the binder is reduced due to an excessive dispersant content, positive electrode adhesion may be degraded. Also, when the content of the dispersant is less than 0.2 parts by weight with respect to 100 parts by weight of solids in the positive electrode slurry composition, the lithium iron phosphate and the binder are not effectively mixed due to excessive agglomeration of the lithium iron phosphate, and thus positive electrode adhesion may be degraded.

(3) Binder

The binder serves to aid in the binding of the positive electrode active material, the conductive material, and the like to one another and to a current collector. Specific examples thereof include polyvinylidene fluoride (PVDF), polyvinyl alcohol, carboxymethylcellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber, fluoro-rubber, various copolymers thereof, and the like, which may be used alone or in combination of two or more thereof.

The binder may be included in an amount of 1 part by weight to 4 parts by weight, specifically 1.5 parts by weight to 4 parts by weight, and more specifically 2 parts by weight to 3.5 parts by weight with respect to 100 parts by weight of solids in the positive electrode slurry composition. When the content of the binder satisfies the above-described range, a contact area between the binder and the lithium iron phosphate is increased, and thus excellent positive electrode adhesion can be ensured.

(4) Conductive Material

The conductive material is not particularly limited as long as it does not cause a chemical change in a battery and has conductivity. For example, graphite; carbon-based materials such as carbon black, acetylene black, Ketjen black, channel black, furnace black, lamp black, thermal black, and the like; conductive fibers such as carbon fibers, metal fibers, and the like; metal powders such as fluorinated carbon, aluminum, nickel powders, and the like; conductive whiskers such as zinc oxide, potassium titanate, and the like; conductive metal oxides such as titanium oxide and the like; and conductive materials such as polyphenylene derivatives and the like may be used. Specific examples of a commercially available conductive material include acetylene black-based products (Chevron Chemical Company), Denka black (Denka Singapore Private Limited), Gulf Oil Company products, Ketjen black, EC-based products (Armak Company), Vulcan XC-72 (Cabot Company), Super P (Timcal), and the like. Preferably, the conductive material may be carbon nanotubes. Since the conductive network of carbon nanotubes may mitigate a migration phenomenon of the binder in a drying process of the positive electrode slurry composition, carbon nanotubes are particularly preferred as the conductive material included in the positive electrode slurry composition of the present disclosure.

The conductive material may be included in an amount of 0.1 parts by weight to 3.0 parts by weight, specifically 0.2 parts by weight to 2.0 parts by weight, and more specifically 0.6 parts by weight to 1.2 wt % with respect to 100 parts by weight of solids in the positive electrode slurry composition. When the above-described range is satisfied, the conductive network of a positive electrode is ensured, and thus the electrical conductivity of the positive electrode can be improved.

(5) Solvent

As the solvent, any solvent that is typically used in the art may be used, and examples thereof include dimethyl sulfoxide (DMSO), isopropyl alcohol, N-methyl-2-pyrrolidone (NMP), acetone, water, and the like, which may be used alone or in combination of two or more thereof.

Meanwhile, the positive electrode slurry composition may include solids and the solvent. In this case, the solids may include at least one among the positive electrode active material, the conductive material, the binder, and the dispersant.

According to an embodiment of the present invention, a solid content of the composition may be 40 wt % to 75 wt %, specifically 50 wt % to 70 wt %, and more specifically 55 wt % to 65 wt %. When the solid content satisfies the above-described range, the composition can have a slurry viscosity suitable for a slurry coating process such as slot-die coating.

In this case, the composition may include, with respect to 100 parts by weight of the solids in the positive electrode slurry composition, 0.1 parts by weight to 3.0 parts by weight of the conductive material, 1 part by weight to 4 parts by weight of the binder, and 0.2 parts by weight to 0.9 parts by weight of the dispersant. When the contents of the conductive material, binder, and dispersant satisfies the above-described ranges, agglomeration of the lithium iron phosphate is suppressed, and thus positive electrode adhesion can be substantially improved.

Positive Electrode

Next, a positive electrode according to the present disclosure will be described.

The positive electrode includes a positive electrode current collector and a positive electrode active material layer positioned on at least one surface of the positive electrode current collector. In this case, the positive electrode active material layer includes a positive electrode active material, a conductive material, a binder, and a dispersant, the positive electrode active material includes lithium iron phosphate, the lithium iron phosphate has an average particle diameter $D_{50}$ of 1.5 μm or more, and the dispersant is included in an amount of 0.2 wt % to 0.9 wt % in the positive electrode active material layer. The positive electrode may be formed using the above-described positive electrode slurry composition. The positive electrode active material, dispersant, binder, and conductive material have been described above.

In the case of the positive electrode according to an embodiment of the present invention, since the lithium iron phosphate has an average particle diameter $D_{50}$ of 1.5 μm or more, and the dispersant is included in an amount of 0.2 wt % to 0.9 wt % in the positive electrode active material layer, adhesion is enhanced. Accordingly, even when a separate layer for enhancing adhesion, such as a primer coating layer or a binder layer having a high binder content, is not provided between the positive electrode current collector and the positive electrode active material layer, adhesion may be exhibited at the same or higher levels than that of a positive electrode provided with the separate layer.

The positive electrode current collector is not particularly limited as long as it does not cause a chemical change in a battery and has conductivity. For example, copper, stainless steel, aluminum, nickel, titanium, calcined carbon, or aluminum or stainless steel whose surface has been treated with carbon, nickel, titanium, silver, or the like may be used as the current collector.

The positive electrode current collector may have a thickness of 3 μm to 500 μm and may have fine irregularities formed on the surface thereof to increase the adhesion to a positive electrode active material layer. For example, the positive electrode current collector may be used in any of various forms such as a film, a sheet, a foil, a net, a porous material, a foam, a non-woven fabric, and the like.

The positive electrode active material layer may be positioned on at least one surface of the positive electrode current collector and formed of the above-described positive electrode slurry composition.

The positive electrode may be manufactured by a typical method of manufacturing a positive electrode, except that the above-described positive electrode slurry composition is used. Specifically, the positive electrode may be manufactured by applying the positive electrode slurry composition onto a positive electrode current collector, followed by drying and rolling.

As another method, the positive electrode may be manufactured by laminating, on a positive electrode current collector, a film obtained by casting the positive electrode slurry composition on a separate support and removing it from the support.

The positive electrode according to an embodiment of the present invention may have excellent positive electrode adhesion. Specifically, in the positive electrode, the positive electrode active material layer may have enhanced adhesion to the positive electrode current collector. As a result, the separation of the positive electrode is prevented, and thus the cell resistance of a secondary battery can be lowered, the capacity and output characteristics of a battery can be enhanced, and defects that are generated in a manufacturing process can be reduced.

The positive electrode may have a positive electrode adhesion of 32 gf/20 mm or more, specifically 35 gf/20 mm or more, and more specifically 40 gf/20 mm to 200 gf/20 mm as measured by a 90° peel test. This positive electrode adhesion is higher than the positive electrode adhesion of a conventional positive electrode using lithium iron phosphate. The positive electrode adhesion may be exhibited because the lithium iron phosphate has an average particle diameter $D_{50}$ of 1.5 μm or more and the dispersant is included in an amount of 0.2 wt % to 0.9 wt % in the positive electrode active material layer.

In addition, the positive electrode according to an embodiment of the present invention has a structure in which the positive electrode active material layer directly faces the positive electrode current collector and may not include a separate layer for enhancing adhesion between the positive electrode active material layer and the positive electrode current collector. Even when a separate layer such as a binding layer, an adhesive layer, a bonding layer, or a primer coating layer, which may be interposed to enhance adhesion between the positive electrode current collector and the positive electrode active material layer, is not included, the positive electrode according to the present disclosure may exhibit excellent adhesion such as interfacial adhesion between the positive electrode current collector and the positive electrode active material layer within the above numerical range.

Meanwhile, the positive electrode may have a resistance per unit area of 9 $\Omega \cdot cm^2$ or less, specifically 8 $\Omega \cdot cm^2$ or less, and more specifically 7 $\Omega \cdot cm^2$ or less, for example, 1 $\Omega \cdot cm^2$ to 9 $\Omega \cdot cm^2$. The resistance may be exhibited because agglomeration of the lithium iron phosphate is minimized and a small amount of the dispersant is used.

Lithium Secondary Battery

Next, a lithium secondary battery according to the present disclosure will be described.

The lithium secondary battery includes a positive electrode, a negative electrode, a separator interposed between the positive electrode and the negative electrode, and an electrolyte.

The positive electrode in the lithium secondary battery has been described above. For example, the positive electrode includes a positive electrode active material, a conductive material, a binder, and a dispersant in a positive electrode active material layer, the positive electrode active material includes lithium iron phosphate, the lithium iron phosphate has an average particle diameter $D_{50}$ of 1.5 μm or more, and the dispersant is included in an amount of 0.2 wt % to 0.9 wt % in the positive electrode active material layer.

The negative electrode may be manufactured, for example, by preparing a composition for forming a negative electrode, which includes a negative electrode active material, a negative electrode binder, and a negative electrode conductive material, and then applying the composition onto a negative electrode current collector.

The negative electrode active material is not particularly limited, and any compound capable of reversibly intercalating and deintercalating lithium may be used. Specific examples thereof include: carbonaceous materials such as artificial graphite, natural graphite, graphitized carbon fiber, amorphous carbon, high-crystallinity carbon, and the like; metallic compounds capable of alloying with lithium, such as Si, Al, Sn, Pb, Zn, Bi, In, Mg, Ga, Cd, a Si alloy, a Sn alloy, an Al alloy, and the like; and composites including metallic compounds and carbonaceous materials. Examples of low-crystallinity carbon include soft carbon and hard carbon, and examples of the high-crystallinity carbon include natural graphite, Kish graphite, pyrolytic carbon, mesophase pitch-based carbon fiber, meso-carbon microbeads, mesophase pitches, and high-temperature calcined carbon such as petroleum or coal tar pitch-derived cokes, which may be used alone or in combination of two or more thereof. Also, as the negative electrode active material, a lithium metal thin film may be used.

The negative electrode conductive material is used to impart conductivity to the electrode, and any conductive material that does not cause a chemical change in a battery and has conductivity may be used without particular limitation. Specific examples thereof include graphite such as natural graphite, artificial graphite, and the like; carbon-based materials such as carbon black, acetylene black, Ketjen black, channel black, furnace black, lamp black, thermal black, carbon fiber, carbon nanotubes, and the like; powders or fibers of metals such as copper, nickel, aluminum, silver, and the like; conductive whiskers such as zinc oxide, potassium titanate, and the like; conductive metal oxides such as titanium oxide and the like; and conductive polymers such as polyphenylene derivatives and the like, which may be used alone or in combination of two or more thereof. The negative electrode conductive material may be typically included in an amount of 1 to 30 wt %, preferably 1 to 20 wt %, and more preferably 1 to 10 wt % with respect to the total weight of a negative electrode active material layer.

The negative electrode binder serves to enhance the cohesion between negative electrode active material particles and the adhesion between the negative electrode active material and the negative electrode current collector. Specific examples thereof include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropyl cellulose, regenerated cellulose, polyvinylpyrrolidone, polytetrafluoroethylene, polyethylene, polypropylene, ethylene-propylene-diene monomer rubber (EPDM rubber), a sulfonated EPDM, styrene butadiene rubber (SBR), fluororubber, and various copolymers thereof, which may be used alone or in combination of two or more thereof. The negative electrode binder may be included in an amount of 1 wt % to 30 wt %, preferably 1 wt % to 20 wt %, and more preferably 1 wt % to 10 wt % with respect to the total weight of a negative electrode active material layer.

Meanwhile, the negative electrode current collector is not particularly limited as long as it does not cause a chemical change in a battery and has high conductivity. For example, copper, stainless steel, aluminum, nickel, titanium, calcined carbon, or copper or stainless steel whose surface has been treated with carbon, nickel, titanium, silver, or the like, an aluminum-cadmium alloy, or the like may be used as the negative electrode current collector.

In addition, the negative electrode current collector may typically have a thickness of 3 μm to 500 μm. Like the positive electrode current collector, the negative electrode current collector may have fine irregularities formed on the surface thereof to increase the adhesion of a negative electrode active material. For example, the negative electrode current collector may be used in any of various forms such as a film, a sheet, a foil, a net, a porous material, a foam, a non-woven fabric, and the like.

Meanwhile, as the separator in the lithium secondary battery, any separator that is typically used as a separator in a lithium secondary battery may be used without particular limitation, and in particular, a separator that exhibits low resistance to the migration of electrolyte ions and has an excellent electrolyte impregnation ability is preferred. Specifically, a porous polymer film, for example, a porous polymer film made of a polyolefin-based polymer such as an ethylene homopolymer, a propylene homopolymer, an ethylene/butene copolymer, an ethylene/hexene copolymer, an ethylene/methacrylate copolymer, or the like or a stacked structure having two or more layers thereof, may be used. Also, a typical porous non-woven fabric, for example, a non-woven fabric made of high-melting-point glass fiber, polyethylene terephthalate fiber, or the like may be used. In addition, the separator may be a porous thin film having a pore diameter of 0.01 μm to 10 μm and a thickness of 5 μm to 300 μm.

Meanwhile, in the lithium secondary battery, the electrolyte may include an organic solvent and a lithium salt, which are typically used in an electrolyte, and they are not particularly limited.

As the organic solvent, any solvent that may function as a medium through which ions involved in an electrochemical reaction of a battery can migrate may be used without particular limitation. Specifically, as the organic solvent, an ester-based solvent such as methyl acetate, ethyl acetate, γ-butyrolactone, ε-caprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; or a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC), or the like may be used.

Among those listed above, the carbonate-based solvent is preferred, and a mixture of a cyclic carbonate-based compound with high ion conductivity and high permittivity (e.g., EC, PC, etc.) and a linear carbonate-based compound with low viscosity (e.g., EMC, DMC, DEC, etc.), which may increase the charging/discharging performance of a battery, is more preferred.

As the lithium salt, any compound that is able to provide lithium ions used in a lithium secondary battery may be used without particular limitation. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, $LiB(C_2O_4)_2$, or the like may be used. The lithium salt is preferably included at a concentration of about 0.6 mol % to 2 mol % in the electrolyte.

In addition to the above-described electrolyte components, the electrolyte may further include one or more additives such as pyridine, triethylphosphite, triethanolamine, cyclic ether, ethylenediamine, n-glyme, hexaphosphoric triamide, a nitrobenzene derivative, sulfur, a quinone imine dye, an N-substituted oxazolidinone, an N,N-substituted imidazolidine, an ethylene glycol dialkyl ether, an ammonium salt, pyrrole, 2-methoxyethanol, aluminum trichloride, and the like for the purpose of enhancing the lifetime characteristics of a battery, suppressing a decrease in battery capacity, enhancing the discharge capacity of a battery, or the like. In this case, the additives may be included in an amount of 0.1 to 5 wt % with respect to the total weight of the electrolyte.

The lithium secondary battery according to the present disclosure may be manufactured by interposing a separator between the positive electrode and the negative electrode to form an electrode assembly, placing the electrode assembly in a cylindrical battery case or a prismatic battery case, and injecting an electrolyte. Alternatively, the lithium secondary battery may be manufactured by stacking the electrode assembly, impregnating the same with an electrolyte, placing the resultant in a battery case, and sealing the battery case.

In the manufacture of the lithium secondary battery according to the present disclosure, the electrode assembly may be dried to remove one or more organic solvents selected from the group consisting of N-methyl-2-pyrrolidone (NMP), acetone, ethanol, PC, EMC, EC, and DMC, which are used in the manufacture of the positive electrode. When an electrolyte having the same components as the organic solvent used in the manufacture of the positive electrode is used, the process of drying the electrode assembly may be omitted.

As the battery case, any battery case that is typically used in the art may be used, and there is no limitation on an outer shape according to the purpose of the battery. For example, the outer shape of the battery case may be a cylindrical form using a can, a prismatic form, a pouch form, a coin form, or the like.

The lithium secondary battery according to the present disclosure is useful in the fields of portable devices such as mobile phones, laptop computers, digital cameras, and the like, energy storage systems (ESSs), and electric vehicles such as hybrid electric vehicles (HEVs) and the like due to stably exhibiting excellent discharge capacity, output characteristics, and a capacity retention rate.

Hereinafter, embodiments of the present invention will be described in further detail with reference to examples. However, the following examples are merely presented to exemplify the present invention, and the scope of the present invention is not limited to the following examples.

Example 1: Manufacture of Positive Electrode (1) Preparation of Positive Electrode Slurry Composition $LiFePO_4$ having an average particle diameter $D_{50}$ of 2 μm and a BET specific surface area of 11 $m^2/g$ as a positive electrode active material, carbon nanotubes (CNTs) as a conductive material, polyvinylidene fluoride (PVdF) as a binder, and a hydrogenated nitrile-based butadiene rubber (H-NBR) as a dispersant were added to an N-methyl pyrrolidone solvent and stirred to prepare a positive electrode slurry composition. The positive electrode active material, conductive material, binder, and dispersant in the positive electrode slurry composition were present in a weight ratio of 95.7:1.0:2.7:0.3, and a solid content of the positive electrode slurry composition was 60 wt %.

(2) Manufacture of Positive Electrode

The positive electrode slurry composition was applied onto a 15 μm-thick aluminum thin film and then vacuum-dried at 130° C. for 10 hours. Afterward, rolling was performed so that a positive electrode active material layer had a porosity of 29% to manufacture a positive electrode. The positive electrode active material layer had a thickness of 98 μm, and the loading amount of the positive electrode active material layer was 3.6 $mAh/cm^2$.

Example 2: Manufacture of Positive Electrode

A positive electrode was manufactured in the same manner as in Example 1, except that a positive electrode active material and a dispersant were mixed in a weight ratio of 95.2:0.8.

Comparative Example 1: Manufacture of Positive Electrode

A positive electrode was manufactured in the same manner as in Example 1, except that a positive electrode active material and a dispersant were mixed in a weight ratio of 94.65:1.35.

Comparative Example 2: Manufacture of Positive Electrode

A positive electrode was manufactured in the same manner as in Comparative Example 1, except that a positive electrode active material having an average particle diameter $D_{50}$ of 0.8 μm was used.

Comparative Example 3: Manufacture of Positive Electrode

A positive electrode was manufactured in the same manner as in Comparative Example 1, except that a positive electrode active material having an average particle diameter $D_{50}$ of 1.0 μm was used, and a positive electrode active material and a dispersant were mixed in a weight ratio of 95.2:0.8.

Comparative Example 4: Manufacture of Positive Electrode

A positive electrode was manufactured in the same manner as in Comparative Example 1, except that a positive electrode active material having an average particle diameter $D_{50}$ of 1.2 μm was used.

Meanwhile, FIG. 1 to FIG. 4 are scanning electron microscope (SEM) images of respective lithium iron phosphates having an average particle diameter $D_{50}$ of 0.8 μm, 1.0 μm, 1.2 μm, and 2.0 μm, which are used in the positive electrodes manufactured in examples and comparative examples. Specifically, FIG. 1 is an SEM image of lithium iron phosphate included in the positive electrode manufactured in Comparative Example 2, FIG. 2 is an SEM image of Comparative Example 3, FIG. 3 is an SEM image of Comparative Example 4, and FIG. 4 is an SEM image of Examples 1 and 2 and Comparative Example 1, and lithium iron phosphate in the positive electrode is formed in the form of a primary particle and/or a secondary particle.

TABLE 1

| | Average particle diameter ($D_{50}$) of | Content (wt %) | | | |
|---|---|---|---|---|---|
| | positive electrode active material (μm) | Positive electrode active material ($LiFePO_4$) | Conductive material (CNT) | Binder (PVdF) | Dispersant (H-NBR) |
| Example 1 | 2.0 | 95.70 | 1 | 3 | 0.3 |
| Example 2 | 2.0 | 95.20 | 1 | 3 | 0.8 |
| Comparative Example 1 | 2.0 | 94.65 | 1 | 3 | 1.35 |
| Comparative Example 2 | 0.8 | 94.65 | 1 | 3 | 1.35 |
| Comparative Example 3 | 1.0 | 95.2 | 1 | 3 | 0.8 |
| Comparative Example 4 | 1.2 | 94.65 | 1 | 3 | 1.35 |

FIG. 6 is an SEM image of the cross section of the positive electrode of Example 2, and FIG. 7 is an SEM image of the cross section of the positive electrode of Comparative Example 3. In these drawings, bright contrast indicates lithium iron phosphate, and dark contrast indicates that the conductive material and the binder are agglomerated. In addition, it is determined that, as the agglomeration region of the conductive material is uniformly dispersed and the area of the agglomeration region of the conductive material is smaller, the positive electrode active material, the conductive material, and the binder are dispersed well. Also, as the agglomeration region of the conductive material is closer to a spherical shape, the surface area of the agglomerated conductive material is minimized, and as a result, the surface area of the positive electrode active material, which is located adjacent to the conductive material and does not participate in a lithium intercalation/deintercalation reaction, is minimized, and thus the discharge resistance of a lithium secondary battery may be lowered.

In the case of the positive electrode of Example 2, it can be confirmed that the agglomeration region of the conductive material was uniformly dispersed as a whole, a deviation in the area of the agglomeration region of the conductive material was small, and the agglomeration region of the conductive material was close to a spherical shape, as compared to the positive electrode of Comparative Example 3. In the case of the positive electrode of Comparative Example 3, a deviation in the area of the agglomeration region of the conductive material was large, and several large conductive material agglomeration regions having a major axis length of about 10 μm were observed.

In the case of the positive electrode of Example 2, it can be confirmed that the positive electrode active material, the conductive material, and the binder were dispersed well due to a difference in the average particle diameter $D_{50}$ of lithium iron phosphate despite the same dispersant content, as compared to the positive electrode of Comparative Example 3. Also, the positive electrode of Example 2 was expected to achieve excellent discharge resistance in a lithium secondary battery due to the agglomeration of the conductive material in a spherical shape, as compared to the positive electrode of Comparative Example 3.

Experimental Example 1—Evaluation of Positive Electrode Adhesion

Adhesion between a positive electrode active material layer and a positive electrode current collector in each positive electrode manufactured in Examples 1 and 2 and Comparative Examples 1 to 4 was compared.

Specifically, each positive electrode manufactured in Examples 1 and 2 and Comparative Examples 1 to 4 was cut into pieces having a length of 150 mm and a width of 20 mm, and the positive electrode surface was attached in a lengthwise direction to a slide glass having a length of 75 mm and a width of 25 mm using a double-sided adhesive tape. That is, the slide glass was attached to an area corresponding to half of the lengthwise direction of the positive electrode. Then, rubbing was performed 10 times using a roller so that the double-sided adhesive tape was uniformly attached, thereby preparing an evaluation sample.

Next, the slide glass part of the evaluation sample was fixed to the sample stage of a universal testing machine (UTM; LS5, AMETEK), and the half of the positive electrode to which the slide glass was not attached was connected to the load cell of the UTM. The load applied to the load cell was measured while moving the load cell up to 50 mm with a force at an angle of 90° and a speed of 100 mm/min. In this case, the minimum value of the load measured in the section of 20 mm to 40 mm during the driving section was measured as the positive electrode adhesion (gf/20 mm) of each sample. Each positive electrode was measured a total of 5 times, and an average value thereof is shown in Table 2 below.

Experimental Example 2—Measurement of Positive Electrode Resistance

The resistance value of each positive electrode manufactured in Examples 1 and 2 and Comparative Examples 1 to 4 was measured and compared.

Specifically, the positive electrode including a 98 μm-thick positive electrode active material layer, which was manufactured in each of Examples 1 and 2 and Comparative Examples 1 to 4 was cut into pieces having a size of 50 mm×50 mm. Resistance per unit area (10 mm×10 mm) in the thickness direction of the positive electrode active material layer was measured using a positive electrode resistance analyzer (MP tester, HIOKI), and measurement conditions were as follows. Each positive electrode was measured 3 times, and then an average value of the three measurement values when the standard deviation is within 10% is shown in Table 2 below.

Current: 100 μA

Speed: low

Voltage range: 0.5 V

Specific resistance of positive electrode current collector: $2.82E^{0.6}$ Ω·cm for aluminum used above

Experimental Example 3—Measurement of Cell Resistance (1) Manufacture of Lithium Secondary Battery Artificial graphite as a negative electrode active material, Super C as a conductive material, and SBR/CMC as a binder were mixed in a weight ratio of 96:1:3 to prepare a negative electrode slurry, and the slurry was applied onto one surface of a copper current collector, dried at 130° C., and rolled to manufacture a negative electrode. The loading amount of a negative electrode active material layer in the manufactured negative electrode was 3.6 $mAh/cm^2$, and the negative electrode active material layer had a porosity of 29%.

Next, an 18 μm-thick polypropylene separator was interposed between the manufactured positive electrode and negative electrode to manufacture an electrode assembly. The electrode assembly was accommodated in an aluminum pouch-type battery case, 500 μl of an electrolyte in which 1.0 M $LiPF_6$ and 2 wt % vinylene carbonate (VC) were dissolved in an organic solvent (EC/EMC/DMC=3:3:4 volume ratio) was injected, and the battery case was vacuum-sealed. The electrolyte was aged for a day, activated at 7.9 mAh for 3 hours, and then further aged for 3 days. Finally, a degassing process was performed to manufacture a lithium secondary battery.

(2) Measurement of Cell Resistance

The cell resistance value of the lithium secondary battery manufactured using each positive electrode of Examples 1 and 2 and Comparative Examples 1 to 4 was measured and compared.

Specifically, for each lithium secondary battery manufactured according to Examples 1 and 2 and Comparative Examples 1 to 4, a value obtained by dividing a voltage drop value exhibited when a discharge pulse was applied at a state of charge (SOC) of 50% and 197.5 mAh for 10 seconds by a current value was measured as cell resistance (SOC50 discharge resistance).

In this case, initial cell resistance refers to a resistance value measured after the lithium secondary battery was manufactured, and cell resistance after 100 cycles refers to a resistance value measured after charging and discharging were repeated 100 times under the condition of 26.3 mAh, a range of 2.5 V to 3.6 V, and 45° C. Measurement results are shown in the following Table 2.

TABLE 2

| | Positive electrode Adhesion (gf/20 mm) | Positive electrode resistance ($\Omega \cdot cm^2$) | Initial cell resistance (m$\Omega$) | Cell resistance after 100 cycles (m$\Omega$) |
|---|---|---|---|---|
| Example 1 | 53 | 6.4 | 1.2 | 1.1 |
| Example 2 | 37 | 7.7 | 1.3 | 1.2 |
| Comparative Example 1 | 8 | 10.0 | 1.4 | 2.0 |
| Comparative Example 2 | not determined | not determined | not determined | not determined |
| Comparative Example 3 | 30 | 21.7 | 1.4 | 1.8 |
| Comparative Example 4 | not determined | not determined | not determined | not determined |

Referring to Table 2, it can be confirmed that the positive electrode of Comparative Example 1, in which the content of a dispersant in a positive electrode active material layer exceeded 0.9 wt %, exhibited substantially low positive electrode adhesion and high positive electrode resistance compared to the positive electrodes of Examples 1 and 2. Also, it can be confirmed that the initial cell resistance of the lithium secondary battery using the positive electrode of Comparative Example 1 was higher than that of Example 1, and the cell resistance after 100 cycles was substantially increased compared to the initial cell resistance.

It can be confirmed that the positive electrode of Comparative Example 3, in which lithium iron phosphate had an average particle diameter $D_{50}$ of less than 1.5 μm, exhibited low positive electrode adhesion and substantially high positive electrode resistance compared to the positive electrodes of Examples 1 and 2. Also, it can be confirmed that the initial cell resistance of the lithium secondary battery using the positive electrode of Comparative Example 3 was higher than that of Example 1, and the cell resistance after 100 cycles was increased compared to the initial cell resistance. However, in the case of the positive electrode of Comparative Example 3, since a positive electrode active material had a larger particle size than that of Comparative Example 2, and the content of a dispersant was lower than that of Comparative Example 4, the separation of a positive electrode active material layer did not occur.

In the case of the positive electrodes of Comparative Examples 2 and 4 in which lithium iron phosphate had an average particle diameter $D_{50}$ of less than 1.5 μm and the content of a dispersant in a positive electrode active material layer exceeded 0.9 wt %, positive electrode adhesion was substantially degraded, and thus the positive electrode active material layer of Comparative Example 2 was completely separated from a current collector in a rolling process, and the positive electrode active material layer of Comparative Example 4 was partially separated from a current collector. For example, FIG. 5 is an image showing that the positive electrode manufactured using the positive electrode slurry composition of Comparative Example 4 is partially separated after being rolled, and the positive electrode active material layer of Comparative Example 4 was partially separated from a current collector as shown in FIG. 5. Therefore, the measurement of the positive electrode adhesion, positive electrode resistance, initial cell resistance, and cell resistance after 100 cycles of the positive electrodes and lithium secondary batteries of Comparative Examples 2 and 4 was not possible.

Meanwhile, it can be confirmed that the positive electrode of Example 1 exhibited high positive electrode adhesion and low resistance compared to the positive electrode of Example 2. Also, it can be confirmed that the lithium secondary battery using the positive electrode of Example 1 exhibited low initial cell resistance and low cell resistance after 100 cycles compared to the lithium secondary battery using the positive electrode of Example 2.

The invention claimed is:

1. A positive electrode slurry composition comprising a positive electrode active material, a conductive material, a binder, a dispersant, and a solvent, wherein the positive electrode active material includes lithium iron phosphate, the lithium iron phosphate has an average particle diameter $D_{50}$ of from 1.5 μm to 4.5 μm, and the dispersant is included in an amount of 0.2 parts by weight to 0.9 parts by weight with respect to 100 parts by weight of solids in the positive electrode slurry composition, wherein the lithium iron phosphate is included in an amount of 94.8 parts by weight to 98.0 parts by weight with respect to 100 parts by weight of solids in the positive electrode slurry composition, wherein the dispersant includes a hydrogenated nitrile-based butadiene rubber, wherein the conductive material includes carbon nanotubes, where the conductive material is included in an amount of 0.1 parts by weight to 1.2 parts by weight respect to 100 parts by weight of solids in the positive electrode slurry composition.

2. The positive electrode slurry composition of claim 1, wherein the lithium iron phosphate is in a form of a secondary particle having a plurality of primary lithium iron phosphate particles.

3. The positive electrode slurry composition of claim 1, wherein the lithium iron phosphate is a compound represented by the following Chemical Formula 1

$$Li_{1+a}Fe_{1-x}M_x(PO_{4-b})X_b \quad \text{[Chemical Formula 1]}$$

wherein, in Chemical Formula 1, M is any one or two or more elements selected from the group consisting of Al, Mg, Ni, Co, Mn, Ti, Ga, Cu, V, Nb, Zr, Ce, In, Zn, and Y, X is any one or two or more elements selected from the group consisting of F, S, and N, and a, b, and x satisfy $-0.5 \leq a \leq 0.5$, $0 \leq b \leq 0.1$, and $0 \leq x \leq 0.5$, respectively.

4. The positive electrode slurry composition of claim 1, wherein the dispersant is included in an amount of 0.2 parts by weight to 0.7 parts by weight with respect to 100 parts by weight of solids in the positive electrode slurry composition.

5. The positive electrode slurry composition of claim 1, wherein the binder is included in an amount of 1 part by weight to 4 parts by weight with respect to 100 parts by weight of solids in the positive electrode slurry composition.

6. The positive electrode slurry composition of claim 1, wherein a solid content of the positive electrode slurry composition is 40 wt % to 75 wt %.

7. A positive electrode comprising:

a positive electrode current collector and a positive electrode active material layer positioned on at least one surface of the positive electrode current collector, wherein the positive electrode active material layer includes a positive electrode active material, a conductive material, a binder, and a dispersant, wherein the positive electrode active material includes lithium iron phosphate, wherein the lithium iron phosphate has an average particle diameter $D_{50}$ of from 1.5 μm to 4.5 μm, and wherein the dispersant is included in an amount of 0.2 wt % to 0.9 wt % in the positive electrode active material layer, wherein the lithium iron phosphate is included in an amount of 94.8 parts by weight to 98.0 parts by weight with respect to 100 parts by weight of solids in the positive electrode slurry composition, and wherein the dispersant includes a hydrogenated nitrile-based butadiene rubber, wherein the conductive material includes carbon nanotubes, where the conductive material is included in an amount of 0.1 parts by weight to 1.2 parts by weight respect to 100 parts by weight of solids in the positive electrode slurry composition.

8. The positive electrode of claim 7, wherein the positive electrode has a positive electrode adhesion of 32 gf/20 mm or more as measured by a 90° peel test.

9. The positive electrode of claim 7, wherein the positive electrode has a resistance value per unit area in a thickness direction of the positive electrode of 9 $\Omega \cdot cm^2$ or less.

10. The positive electrode of claim 7, wherein the positive electrode active material layer directly contacts the positive electrode current collector.

11. A lithium secondary battery comprising a positive electrode, a negative electrode, a separator, and an electrolyte, wherein the positive electrode includes a positive electrode active material, a conductive material, a binder, and a dispersant in a positive electrode active material layer, wherein the positive electrode active material includes lithium iron phosphate, wherein the lithium iron phosphate has an average particle diameter $D_{50}$ of from 1.5 μm to 4.5 μm, and wherein the dispersant is included in an amount of 0.2 wt % to 0.9 wt % in the positive electrode active material layer, wherein the lithium iron phosphate is included in an amount of 94.8 parts by weight to 98.0 parts by weight with respect to 100 parts by weight of solids in the positive electrode slurry composition, and wherein the dispersant includes a hydrogenated nitrile-based butadiene rubber, wherein the conductive material includes carbon nanotubes, where the conductive material is included in an amount of 0.1 parts by weight to 1.2 parts by weight respect to 100 parts by weight of solids in the positive electrode slurry composition.

12. A method of manufacturing a positive electrode, comprising:

stirring and mixing the positive electrode slurry composition of claim 1; and applying the positive electrode slurry composition onto a positive electrode current collector, followed by drying and rolling.

* * * * *